United States Patent [19]

Weinlich et al.

[11] 4,356,283

[45] Oct. 26, 1982

[54] VINYL CHLORIDE POLYMER MIXTURES FOR PROCESSING AS PLASTISOLS OR ORGANOSOLS

[75] Inventors: Jürgen Weinlich, Eppstein; Otto Plewan, Neuötting, both of Fed. Rep. of Germany; Hans-Joachim Leugering, deceased, late of Burgkirchen, Fed. Rep. of Germany; by Ursula M. Leugering nee Wegener, heiress, Hamm, Fed. Rep. of Germany; by Lothar Leugering, heir, Wildeck, Fed. Rep. of Germany; by Manfred Leugering, heir, Frankfurt am Main, Fed. Rep. of Germany; by Rita Bahn nee Leugering, heiress, Liederbach, Fed. Rep. of Germany; by Günter Leugering, heir, Frankfurt am Main, Fed. Rep. of Germany

[73] Assignee: Hoechst Aktiengesellschaft, Fed. Rep. of Germany

[21] Appl. No.: 262,172

[22] Filed: May 11, 1981

[30] Foreign Application Priority Data

May 17, 1980 [DE] Fed. Rep. of Germany ....... 3018940

[51] Int. Cl.$^3$ .................. C08L 27/06; C08L 51/00
[52] U.S. Cl. .................. 524/504; 523/221; 525/302; 525/80
[58] Field of Search ........... 525/302, 80; 524/504

[56] References Cited

U.S. PATENT DOCUMENTS

| | | | |
|---|---|---|---|
| 3,358,054 | 12/1967 | Hardt et al. | 525/302 |
| 3,853,970 | 12/1974 | Dietrich | 525/80 |
| 4,006,201 | 2/1977 | Bauer et al. | 525/302 |

FOREIGN PATENT DOCUMENTS 50-4225  2/1975  Japan .................. 525/80

*Primary Examiner*—Carman J. Seccuro
*Attorney, Agent, or Firm*—Connolly and Hutz

[57] ABSTRACT

A process is described for the preparation of mixtures for processing as plastisols or organosols, wherein at least one known plasticizer, at least one first vinyl chloride copolymer and at least one vinyl chloride homopolymer or a second vinyl chloride copolymer are mixed together, if appropriate with the addition of further known substances. The first copolymer is a specific vinyl chloride graft copolymer, of which 5 to 70% by weight are employed, relative to the total quantity of polymers present in the mixture. It contains 99.5 to 88% by weight of polymerized units of vinyl chloride, 0.1 to 11.9% by weight of polymerized units of vinyl acetate and 0.1 to 2.2% by weight of polymerized units of ethylene. The remaining polymer(s) employed is/are prepared in accordance with customary processes.

Mixtures prepared in this manner produce plastisols or organosols which have a low viscosity and good stability on storage and which also enable uniform coatings to be obtained by applying a thin layer.

7 Claims, No Drawings

VINYL CHLORIDE POLYMER MIXTURES FOR PROCESSING AS PLASTISOLS OR ORGANOSOLS

Plastisol mixtures or organosol mixtures are used for the production of film coverings and coatings for a very wide variety of products. In general, such plastisol mixtures are defined as dispersions of fine particles consisting of thermoplastic polymers in a liquid, non-volatile plasticizer in which the polymers are insoluble at room temperature, but in which they become essentially completely solvated at elevated temperatures, so that a homogeneous solution is obtained, which solidifies on cooling to form a more or less solid gel. If the mixture additionally contains diluents with little or no solvent action, it is described as an organosol. If a "plastisol" is mentioned in the following description, this is also intended to mean, according to the context, "organosol."

Plastisols (also called "pastes") are prepared by using, for example, vinyl chloride polymers which are specially prepared for this purpose by emulsion polymerization in water and subsequent spray drying. Recently, the so-called microsuspension process has also been used for the preparation of vinyl chloride polymers for plastisols. In this method, the vinyl chloride is dispersed in water in the presence of emulsifiers before the polymerization and is then polymerized with the aid of oil-soluble agents which form free radicals. In general, such "polyvinyl chloride paste polymers" have average particle diameters between about 0.2 and 4 $\mu$m, it being possible for these particles to be loosely assembled to form secondary agglomerates which in turn have particle sizes between about 10 and 30 $\mu$m. In general, the aim is that these secondary agglomerates shall disintegrate rapidly when dispersed in plasticizers, since by this means low paste viscosities can be obtained.

It is also known to reduce the viscosities of plastisols which have been formed from the vinyl chloride polymers described above and have a relatively low plasticizer content, by adding polymers of vinyl chloride which have a particle size of about 30 to about 200 $\mu$m. Such polymers are also described as "paste extenders" or, simply, just as "extender" polymers. They are generally prepared by suspension polymerization.

Thus a process for the suspension polymerization of vinyl chloride in water in the presence of methylhydroxypropylcellulose as the sole dispersing agent, using monomer-soluble catalysts is disclosed in German Offenlegungsschrift No. 1,645,668, the methylhydroxypropylcelluloses used being products which have a viscosity of 50 to 500 mPa.s/20° C. in a 2% strength by weight solution. If desired, up to 10% by weight, relative to the weight of the vinyl chloride, of vinyl and/or acrylic compounds which are miscible with vinyl chloride, in particular vinyl acetate, can be polymerized together with the vinyl chloride. Products are obtainable by this means in which at least 80% by weight of all the particles have a size less than 100 $\mu$m. Although the viscosity-reducing properties of the polymers thus prepared are relatively good, processing problems, such as deposition of coarse constituents are caused by the constituents having particle sizes greater than 100 $\mu$m present in these polymers. In addition, polymers containing coarse constituents are unsuitable, particularly for thin coatings having a smooth surface, such as are customary nowadays.

German Offenlegungsschrift No. 1,694,312 describes plastisol mixtures which, in addition to a liquid, non-volatile plasticizer, contain a mixture of polymers in which one component consists of a vinyl chloride homopolymer prepared by suspension polymerization or a vinyl chloride copolymer which contains at least 80% by weight of vinyl chloride units and which has an average particle diameter of 80 to 180 $\mu$m and an intrinsic viscosity of 0.5 to 1.2 (K-value approximately 50 to 80), and the other component consists of a vinyl chloride homopolymer or a vinyl chloride copolymer which contains at least 95% by weight of vinyl chloride units and has an average particle diameter less than about 0.25 $\mu$m and an intrinsic viscosity less than about 0.9 (K value approximately 66), it being necessary for at least 5 and preferably 10 to 30% by weight of the last-mentioned polymers to be present in the polymeric mixture. Because of its high particle size, this plastisol mixture also does not meet the modern requirements for the application of thin layers and tends to form an undesirable deposit after a prolonged period of storage.

As shown in the comparison test C, described later, small particle sizes are achieved in a vinyl chloride homopolymer prepared by suspension polymerization if certain quantities of emulsifier are added during the polymerization. A polymer of this type has no tendency to settle out and is also suitable for applying fairly thin layers, but such a material exhibits only a low reduction in the viscosity of the plastisol prepared therewith, and a comparatively low bulk density. Furthermore, East German Patent Specification 130,260 discloses a polyvinyl chloride/extender mixture for plastisols which consists of 10 to 60% of suspension PVC having a plasticizer absorption of 5 to 25% and particle sizes <150 $\mu$m, 20 to 80% of an emulsion PVC having methanol extracts of 1 to 3% and particle sizes from 5 to 60 $\mu$m and 10 to 50% of a microsuspension PVC having particle sizes from 0.2 to 3 $\mu$m. More precise details on the preparation of the various polymers are not available in the Specification. This Specification also shows how difficult it is to achieve a fairly high reduction in viscosity, absence of settling out and small particle size without coarse constituents in the case of extender polymers. The settling out problem cannot be completely eliminated even via the involved process of mixing three different polymers, as is made clear by Examples 1 and 2 according to the invention.

A process has now, surprisingly, been found which, by the addition of quite specific vinyl chloride graft copolymers as extender polymers in mixtures for processing as plastisols or organosols, provides plastisols or organosols, respectively, which do not exhibit the disadvantages described above.

This is a process for the preparation of mixtures for processing as plastisols or organosols, wherein at least one known plasticizer for vinyl chloride polymers, at least one first vinyl chloride copolymer and at least one vinyl chloride homopolymer or a second vinyl chloride copolymer are mixed together, if appropriate with the addition of at least one known heat stabilizer for vinyl chloride polymers and further known substances, which process comprises employing, as the first vinyl chloride copolymer, 5 to 70% by weight, relative to the total quantity of polymers present in the mixture, of a vinyl chloride graft copolymer which has been prepared in the presence of at least one oil-soluble activator which decomposes to give free radicals, a suspension stabilizer and an emulsifier and, if appropriate, further polymerization auxiliaries, which has a K value of 50 to 80 and an average particle size of 20 to 60 $\mu$m and which contains: 99.5 to 88% by weight, relative to the graft copolymer, of polymerized vinyl chloride units, 0.1 to 11.9% by weight, relative to the graft copolymer, of polymerized vinyl acetate units and 0.1 to 2.2% by weight, relative to the graft copolymer, of polymerized ethylene units, with the proviso that the total of the polymerized units of ethylene and vinyl acetate is 0.5 to 12% by weight, relative to the graft copolymer, this graft copolymer having been prepared by polymerizing vinyl chloride or a mixture of vinyl chloride and vinyl acetate in the presence of 0.45 to 2.5% by weight, relative to the monomer or mixture of monomers employed, of a copolymer which contains 20 to 80% by weight, relative to the copolymer, of polymerized vinyl acetate units and 80 to 20% by weight, relative to the copolymer, of polymerized ethylene units, and which has a molecular weight, determined by osmotic methods, of 5,000 to 200,000.

If less than 5% by weight of the vinyl chloride graft copolymer are employed, relative to the total quantity of the polymers present in the mixture, only an inadequate reduction in viscosity will generally be achieved. If over 70% by weight are employed, relative to the total quantity of the polymers present in the mixture, the processing properties of the plastisol will decline; the addition of excessively large quantities of vinyl chloride graft copolymer will again increase the viscosity of the plastisol. It is preferable to employ 10 to 60% by weight, relative to the total quantity of polymer employed, of the vinyl chloride graft copolymer described.

The vinyl chloride graft copolymer appropriately has a K value of 50 to 80. Outside this range, the mechanical properties of the products made from the plastisols will decline, or gelling difficulties will arise. It is preferable to employ a vinyl chloride graft copolymer which has a K value of 55 to 77.

The vinyl chloride graft copolymer to be employed in accordance with the invention should have a number-average particle size of 20 to 60 $\mu$m. Below 20 $\mu$m, the viscosity-reducing action falls off, the flow becomes poorer and the formation of dust becomes troublesome, while above 60 $\mu$m the plastisol becomes increasingly less suitable for the production of thin coatings and difficulties arise when spreading, owing to surface inequalities and fluctuations in processing viscosity, since plastisols composed of mixtures of polymers containing a polymer with a fairly high average particle size tend to settle out. It is preferable to employ a vinyl chloride graft copolymer which has an average particle size of 30 to 55 $\mu$m.

In general, the plasticizer absorption, determined as described below, should be as low as possible in the case of the vinyl chloride graft copolymer, since fairly high plasticizer absorptions reduce, to an increasing extent, the viscosity-reducing action and the viscosity stability of the plastisols when stored. The vinyl chloride graft copolymers preferably have a plasticizer absorption of 5 to 12%, particularly 5 to 9%.

The graft copolymer to be employed in accordance with the invention contains 99.5 to 88% by weight, relative to the graft copolymer, of polymerized units of vinyl chloride; the remaining 0.5 to 12% by weight, relative to the graft copolymer, consists of polymerized units of ethylene and of vinyl acetate. In the previous and following text, the phrase "relative to the graft copolymer" is to be understood as meaning that the corresponding percentages relate to a pure graft copolymer which no longer contains any residues of activators, suspension auxiliaries, emulsifiers and miscellaneous polymerization auxiliaries. This means that the inevitable content of these substances should be deducted beforehand in calculating the percentage ratio.

At less than 0.5% by weight of polymerized units of ethylene and vinyl acetate, the graft copolymers do not have an adequate reduction in viscosity within the particle size range indicated, while if the total of polymerized units of ethylene and vinyl acetate is above 12% by weight, difficulties arise in respect of constancy of viscosity when the plastisols are stored and the plastisol mixtures generally become too readily capable of gelling.

The vinyl chloride graft copolymers to be employed in accordance with the invention are prepared by polymerizing vinyl chloride or a mixture of vinyl chloride and vinyl acetate monomers in an aqueous suspension in the presence of 0.45 to 2.5% by weight, relative to the monomer or mixture of monomers employed, of a copolymer which, in turn, contains 20 to 80% by weight, relative to the copolymer, of polymerized units of vinyl acetate and 80 to 20% by weight, relative to the copolymer, of polymerized units of ethylene, and which has a molecular weight, determined by osmotic methods, of 5,000 to 200,000, preferably 10,000 to 100,000. The quantity of the ethylene/vinyl acetate copolymer employed is calculated on the basis of 90% conversion in the polymerization. It is also possible to use higher and lower conversions in the polymerization reaction, with good success; suitable account should be taken of this in regard to the quantity of copolymer employed, since the latter remains completely in the graft copolymer produced, while the monomer or monomers employed enter into the graft copolymer produced to an extent depending on their degree of conversion. Very low degrees of conversion, for example less than 80%, are of less interest for economic reasons. If the reaction is carried out in the presence of 2.5% by weight, relative to the monomer employed, of a copolymer formed from ethylene and vinyl acetate, at a 90% conversion a graft copolymer is formed which contains approximately 2.8% by weight, relative to the graft copolymer, of the copolymer originally employed. Above this content of the ethylene/vinyl acetate copolymer originally employed, graft copolymers are generally obtained which are useful within the scope of the invention, but, as the content of ethylene/vinyl acetate polymer increases, it becomes more difficult to adjust the particle size range and the narrow particle size distribution to the desired figure, the spreading test exhibits less advantageous results and the products can no longer be used to an unlimited extent for fairly thin layers, so that the additional outlay associated with an increased charge of the ethylene/vinyl acetate copolymer is less rewarding in respect of the activity achieved thereby.

Particularly good results are obtained if an ethylene/vinyl acetate copolymer containing 40 to 65% by weight of polymerized units of vinyl acetate and 60 to 35% by weight of polymerized units of ethylene is employed for the preparation of the graft copolymers.

The preparation of the vinyl chloride graft copolymer is effected in an aqueous suspension, about 150 to 300 parts of water being used per 100 parts of monomers employed and the temperature of polymerization being adjusted to 35° to 80°, preferably 45° to 75, °C.

The monomers employed are either pure vinyl chloride or a mixture of vinyl chloride and vinyl acetate. It is appropriate to dissolve the ethylene/vinyl acetate copolymer in the monomer or mixture of monomers before the start of the polymerization. The proportion of vinyl acetate in the mixture of monomers is to be kept sufficiently high for 0.1 to 11.9% by weight, relative to the graft copolymer, of polymerized units of vinyl acetate to be present in the end product of the graft polymerization, bearing in mind the proportion of vinyl acetate which is introduced via the ethylene/vinyl acetate copolymer. It is preferable to use sufficient monomeric vinyl acetate mixed with vinyl chloride for 0.1 to 7.9% by weight, relative to the graft copolymer, of polymerized units of vinyl acetate to be present in the final graft copolymer.

The polymerization is carried out in the presence of 0.003 to 1% by weight, preferably 0.01 to 0.3% by weight, relative to the monomer, of one or more oil-soluble activators which form free radicals. Examples of suitable activators are diaryl or diacyl peroxides, such as diacetyl, acetylbenzoyl, dilauroyl, dibenzoyl, bis-2,4-dichlorobenzoyl or bis-2-methylbenzoyl peroxide; dialkyl peroxides, such as di-tert.-butyl peroxide, per-esters, such as tert.-butyl percarbonate, tert.-butyl peracetate, tert.-butyl octoate, tert.-butyl perneodecanoate or tert.-butyl perpivalate, dialkyl peroxydicarbonates, such as diisopropyl, diethylhexyl, dicyclohexyl or diethylcyclohexyl peroxydicarbonate, mixed anhydrides of organic sulfoper-acids and organic acids, such as acetylcyclohexylsulfonyl peroxide; and azo compounds which are known as polymerization catalysts, such as azoisobutyronitrile.

Polymerization is also carried out in the presence of 0.02 to 2% by weight, preferably 0.1 to 1% by weight, of one or more suspension stabilizers. Suitable examples of these are gelatine, copolymers of maleic acid or half-esters thereof with styrenes, polyvinylpyrrolidone and copolymers formed from vinyl acetate and vinylpyrrolidone, water-soluble cellulose derivatives, such as carboxymethylcellulose, hydroxyethylcellulose or aminopropylcellulose, or polyvinyl alcohol, optionally still containing up to 40 mole % of acetyl groups. It is preferable to employ water-soluble cellulose ethers, such as methylcellulose or methylhydroxypropylcellulose and partially acetylated polyvinyl alcohols, a 2% strength by weight aqueous solution of which has a viscosity at 20° C. of 20 to about 1,000 mPa.s (for cellulose ethers) or 2 to about 200 mPa.s (for partially acetylated polyvinyl alcohols).

Polymerization is also carried out in the presence of one or more emulsifiers such as are employed in the emulsion polymerization of vinyl chloride. Amphoteric, cationic and nonionic emulsifiers, and preferably anionic emulsifiers, can be used. Examples of suitable anionic emulsifiers are alkali metal, alkaline earth metal or ammonium salts of fatty acids, such as lauric, palmitic or stearic acid; of acid fatty alcohol sulfuric acid esters, of alkanesulfonic acids, particularly those having a chain length of 10 to 18 C atoms, of alkylarylsulfonic acids, such as dodecylbenzenesulfonic or dibutylnaphthalenesulfonic acids; or of sulfosuccinic acid dialkyl esters, and also the alkali metal and ammonium salts of fatty acids containing epoxy groups, such as epoxystearic acid, or of reaction products of per-acids, for example peracetic acid, with unsaturated fatty acids, such as oleic or linoleic acid, or with unsaturated hydroxy fatty acids, such as ricinoleic acid. The following are examples of suitable amphoteric or cationic emulsifiers: alkylbetaines, such as dodecylbetaine; and alkylpyridinium salts, such as laurylpyridinium hydrochloride, and also alkylammonium salts, such as oxethyldodecylammonium chloride. The following are examples of suitable nonionic emulsifiers: partial esters with fatty acids of polyhydric alcohols, such as glycerol monostearate or sorbitol monolaurate, monooleate or monopalmitate; polyoxyethylene esters of fatty alcohols or aromatic hydroxy compounds; polyoxyalkylene esters of fatty acids and polypropylene oxide/polyethylene oxide condensation products.

Suitable polymerization auxiliaries which may be added are buffer substances, such as, for example, alkali metal acetates, borax, alkali metal phosphates, alkali metal carbonates, ammonia or ammonium salts of carboxylic acids, and also molecular size regulators, such as, for example, aliphatic aldehydes having 2 to 4 carbon atoms, chlorinated or brominated hydrocarbons, such as, for example, dichloroethylene, trichloroethylene, chloroform, bromoform or methylene chloride, and mercaptans, and also antioxidants and further polymerization auxiliaries.

The polymerization can be carried out continuously and, preferably, discontinuously, and the reaction can optionally be carried out with cooling by reflux and the use of two or more stirrer speeds and/or temperature stages. The pH value of the polymerization liquor should be between 2 and about 10.

During the polymerization, one or more of the following substances can be added, if appropriate while maintaining the filled volume of the polymerization vessel constant: water, aqueous solutions, monomers, activators, suspension stabilizers, emulsifiers and further polymerization auxiliaries, such as, for example, buffer substances or regulators.

The polymers thus prepared can be freed from residual monomers, particularly vinyl chloride, in accordance with known processes, either in an aqueous dispersion, in the form of a cake moist with water or in a moist or dry pulverulent condition.

The processing of the aqueous polymer dispersion to give a dry powder is also effected in accordance with known methods, for example by decanting the bulk of the aqueous phase in a decanter-centrifuge and drying the cake, moist with water, thus obtained in a pneumatic or fluidized bed drier.

The polymers which have been prepared in the manner described are used for the process according to the invention for the preparation of mixtures for processing as plastisols or organosols, employing 5 to 70% by weight, preferably 10 to 60% by weight, relative to the total quantity of polymers present in the mixture. The remaining 95 to 30, preferably 90 to 40, % by weight of polymers present in the mixture are appropriately composed of one or more vinyl chloride homopolymers or vinyl chloride copolymers which have been produced in the manner which is in itself known for the preparation of plastisols. As a rule, such polymers have primary particles with average particle sizes of about 0.2 to 4 $\mu$m. These primary particles are formed in the polymerization and can in most cases be agglomerated to form secondary particles of a higher average particle size, for example 5 to 30 $\mu$m, by the subsequent processing of the polymerization batch to give dry polymer. As a rule, however, these agglomerates disintegrate again rapidly into the primary particles when mixed with plasticizers.

Such known polymers which have been produced for the preparation of plastisols can, for example, have been prepared by a known emulsion polymerization reaction in an aqueous liquor in the presence of emulsifiers and water-soluble activators which decompose to give free radicals and are usually of a peroxide type, or by the known microsuspension polymerization process. This process is described, for example, in German patent specification Nos. 962,834 and 1,069,387, German Offenlegungsschrift 2,636,931 and British patent Specification No. 698,359 and U.S. Pat. No. 2,674,585.

In the case of polymers prepared either by the emulsion process or by the microsuspension process, it is also possible to use, instead of pure vinyl chloride, a mixture of vinyl chloride and monomers which are copolymerizable therewith, but this mixture should contain at least 90% by weight of vinyl chloride. In general, the content of comonomers in such polymers should not exceed 5 to 7% by weight, relative to the polymer.

In general, it is sufficient to mix either a known polymer prepared by the emulsion process or a known polymer prepared by the microsuspension process with the vinyl chloride graft copolymer to be employed in accordance with the invention. Mixtures of more than two polymers are, of course, also possible.

Plastisols, described as organosols if diluents are present, are prepared from the polymer mixtures described, for example by grinding with a plasticizer, if appropriate with the concomitant use of volatile and/or non-volatile organic diluents which have little or no dissolving or swelling action. Additives which are customary in such plastisols, such as known heat stabilizers for vinyl chloride polymers, dyestuffs, pigments and fillers, can be used concomitantly in this process.

Suitable plasticizers are any monomeric and polymeric compounds which are customarily used as plasticizers for polyvinyl chloride and copolymers thereof. Plasticizers of this type are described, for example, by H. Gnamm and W. Sommer in "Die Lösungsmittel und Weichmachungsmittel" ("Solvents and Plasticizers"), Stuttgart 1958, pages 589 to 735. It is preferable to use completely esterified dicarboxylic and tricarboxylic acids and also completely esterified polybasic inorganic acids, such as di-n-butyl phthalate, di-2-ethylhexyl phthalate, diethylsebacate, triethylcitrate or tricresylphosphate.

In plastisols, the plasticizers are used in quantities of 15 to 200% by weight, preferably 15 to 100% by weight, relative to the polymers.

For the preparation of organosols, besides 10 to 50% by weight of plasticizers, 10 to 50% by weight, in each case relative to the polymers, of non-volatile organic diluents which have little or no dissolving or swelling action are concomitantly used, in a known manner. Additionally, it is also possible to use volatile diluents, and in any desired quantities, since they will no longer be present in the finished articles manufactured from the organosols, owing to their volatility. An organosol of this type can, for example, contain, in a known manner, high-boiling esters as the plasticizer, petroleum fractions having a boiling point above 125° C. at a pressure of 133 Pa as non-volatile diluents and hydrocarbons boiling in the range from 35° to 250° C. under normal atmospheric pressure as the volatile diluents.

The plastisols or organosols which have been prepared with the polymer mixture described above can be applied in a customary manner to carrier webs by spreading, spraying, dipping or brushing and can also be used for the production of cast moldings and foams.

Plastisols or organosols which have a low viscosity and good stability on storage, both in respect of constancy of viscosity and constituents of the mixture settling out, and which also produce uniform coatings when applied as a thin layer, are obtained by means of the vinyl chloride graft copolymers to be employed in the process according to the invention. Their comparatively high bulk density ensures that the vinyl chloride graft copolymers can be stored and processed in an efficient manner; in addition they can easily be freed from adhering volatile constituents, for example monomers, which makes it possible to process further and to use the articles produced in a manner which is physiologically harmless.

The examples and comparative tests which follow are intended to illustrate the invention in greater detail. In the interests of greater clarity, the experimental results have been collated in a table, the examples according to the invention being marked with numbers and the comparison tests being marked with capital letters.

The properties listed were determined by the following experimental methods:

K-value: As specified in DIN 53,726

Average particle size: By evaluating a particle size analysis specified in DIN Standard 53,195, using the known particle size screen devised by Rosin-Ramler and Sperling.

Proportion of polymer particles >100 $\mu$m: As specified in DIN 53,580, the sieve residue is subjected to determination in the Mocker apparatus, with water as the flushing liquid and using a sieve of 100 $\mu$m mesh width. The proportion is quoted in percent by weight, relative to the quantity of polymer employed.

Plastisol viscosity: The plastisols to be determined are prepared as specified in DIN 54,800. The vinyl chloride copolymer used in this is a copolymer which has been prepared by emulsion polymerization and is suitable for the processing of plastisols, which contains 5% by weight, relative to the polymer, of polymerized units of vinyl acetate and which has the following properties: K value 69, bulk density 360 g/l, emulsifier content 2% by weight, average particle size 15 $\mu$m and initial viscosity 7 Pa.s (determined after 1 hour, at 20° C. and 40 seconds¯on a 60/40 mixture of polymer and di-2-ethylhexyl phthalate).

30 parts by weight of the polymer described in greater detail above are mixed with 30 parts by weight of the extender polymer to be evaluated and with 40 parts by weight of di-2-ethylhexyl phthalate and viscosity determinations are carried out on the mixture as specified in DIN 54,801 1 hour, 4 days and 8 days after the preparation of the mixture. The table which follows shows in each case the percentage by which the viscosity of the polymer mixture determined is lower than that of a mixture in which 60 parts by weight of the emulsion polymer described in greater detail above were employed together with 40 parts by weight of di-2-ethylhexyl phthalate.

Spreading test: The spreading test is carried out on the plastisol made up for the viscosity determination, one hour after making up the mixture. The Erichsen Grindometer, Model 232, is used for this purpose. It consists of a metal block with a ground surface into which a wedge-shaped groove has been cut by milling, this groove having a depth of 100 $\mu$m on one side of the metal block and being level with the surface on the other side of the metal block. The depth of the groove at any particular point can be read off on a scale at the side of the metal block. Two drops of the plastisol to be examined are applied at the deepest point of the groove and the plastisol is spread out in the direction of decreasing groove depth by means of a metal doctor having a polished edge. Starting at a specific point in the direction of spreading, irregularities in the hitherto smooth surface of the plastisol appear, in the shape of longitudinal stripes, which increase rapidly. The depth of the groove, and thus the thickness of the plastisol spread, is read off at the point in the groove at which at least five such stripes are observed. This value is quoted in the table which follows in micrometers and it represents a measure of the minimum thickness at which such a plastisol can be applied without difficulties arising.

Plasticizer absorption: A filter paper saturated with di-2-ethylhexyl phthalate (DOP) is placed to fit tightly on the perforated internal base of a centrifuging beaker insert (a laboratory centrifuge as specified in DIN 58,970E), and the insert is weighed together with the filter paper (weight $m_1$). 10.0 g of polymer sample are then weighed into this insert (weight $m_2$), approx. 20 g of DOP are then added and the mixture is allowed to stand for about 5 minutes. Centrifuging is then carried out for 60 minutes at a centrifugal acceleration at the base of the perforated insert of 25,000 to 26,00 m/s$^2$. The insert is cleaned on the outside by wiping with filter paper and is weighed, together with its contents (weight $m_3$). The plasticizer absorption, which is, inter alia, a measure of the porosity of the polymer particles, is calculated (in % by weight) from the formula:

$$(m_3 - m_2)/(m_2 - m_1) \cdot 100.$$

The values quoted are average figures from ten individual determinations.

Bulk density: As specified in DIN 53,468.

EXAMPLES 1 TO 6 AND COMPARISON TESTS A TO D

The extender polymers which are to be employed in the process according to the invention and which are used for comparison are prepared as follows: a mixture composed of vinyl chloride, an ethylene/vinyl acetate copolymer having an average molecular weight, determined by osmotic methods, of 10,000 to 30,000, demineralized water, a suspending agent, an emulsifier and an activator, such as are mentioned by type and quantity in the table which follows (in the case of Example 6, as can be seen from the table, vinyl acetate is also employed, and in comparison tests C and D the process is carried out in the absence of ethylene/vinyl acetate copolymer and in the absence of vinyl acetate), is stirred for four hours at 20° C. in a 400 l stirred autoclave made of V$_4$A stainless steel, in order to dissolve the ethylene/vinyl acetate copolymer completely in the vinyl chloride monomer. The mixture is then warmed to the temperature which is also indicated in the table, while being stirred further, and is polymerized at this temperature until the pressure has fallen to 0.4 MPa. The pressure is then released and the finely particulate polymer suspension produced is freed from residual vinyl chloride monomer by a known process and is separated from the bulk of the aqueous polymerization liquor by means of a decanter centrifuge. The product thus obtained is dried with hot air (inlet temperature 150° C.; exit temperature 85° C.).

The properties indicated in the table are determined on the extender polymers obtained in this manner. The symbols in the table which follows have the following meanings:

PW = parts by weight

Wt. %VAc = percent by weight of polymerized vinyl acetate, relative to the ethylene/vinyl acetate copolymer (the remainder is composed of polymerized ethylene units);

MC 50 = methylcellulose, a 2% strength by weight aqueous solution of which has a viscosity at 20° C. of 50 mPa.s;

MHPC 50 = methylhydroxypropylcellulose, a 2% strength by weight aqueous solution of which has a viscosity at 20° C. of 50 mPa.s;

MHPC 100 = methylhydroxypropylcellulose, a 2% strength by weight aqueous solution of which has a viscosity at 20° C. of 100 mPa.s;

PVA = polyvinyl alcohol containing 20% by weight of acetate groups, a 4% strength by weight aqueous solution of which has a viscosity at 20° C. of 10 mPa.s;

E I = sodium n-dodecylbenzenesulfonate;

E II = sodium n-alkanesulfonate having chain lengths varying from $C_{12}$ to $C_{16}$ with a predominant content of $C_{14}$;

E III = sodium dibutylnaphthalenesulfonate;

IPP = diisopropyl peroxydicarbonate;

LPO = dilauroyl peroxide;

TBPND = tert.-butyl perneodecanoate.

In the case of the figures of percentage reduction in viscosity which have been marked with an*), a deposit of polymer particles had formed in the plastisol within the storage times indicated in the table.

TABLE

| Example/Comparison test | 1 | 2 | 3 | 4 | 5 | 6 | A | B | C | D |
|---|---|---|---|---|---|---|---|---|---|---|
| Ethylene/vinyl acetate copolymer | 2 PW 45% VAc | 1 PW 45% VAc | 0.5 PW 45% VAc | 1 PW 40% VAc | 1 PW 45% VAc | 1 PW 45% VAc | 0.2 PW 45% VAc | 10 PW 45% VAc | — | — |
| Vinyl chloride, PW | 100 | 100 | 100 | 100 | 100 | 95 | 100 | 100 | 100 | 100 |
| Vinyl acetate, PW | — | — | — | — | — | 5 | — | — | — | — |
| Water, PW | 200 | 200 | 200 | 200 | 200 | 200 | 200 | 200 | 200 | 200 |
| Suspension stabilizer | 0.25 PW MC 50 | 0.2 PW MC 50 | 0.2 PW MHPC 50 | 0.25 PW MHPC 50 | 0.25 PW MHPC 50 | 0.5 PW PVA | 0.25 PW MC 50 | 1 PW MC 50 | 0.3 PW MC 50 | 0.2 PW MHPC 100 |
| Emulsifier | 0.02 PW E I | 0.02 PW E III | 0.02 PW E III | 0.02 PW E I | 0.02 PW E II | 0.05 PW E I | 0.02 PW E III | 0.1 PW E III | 0.05 PW E I | — |
| Activator | 0.02 PW IPP | 0.02 PW IPP | 0.02 PW IPP | 0.05 PW LPO 0.02 PW TBPND | 0.04 PW IPP | 0.02 PW IPP | 0.02 PW IPP | 0.02 PW IPP | 0.02 PW IPP | 0.02 PW IPP |
| Reaction temperature, °C. | 60 | 60 | 60 | 67 | 53 | 60 | 60 | 60 | 60 | 60 |
| K-value | 65.2 | 64.8 | 65.4 | 59.8 | 70.5 | 65.3 | 65.5 | 64.9 | 64.8 | 65.1 |
| Average particle | 24 | 28 | 32 | 27 | 30 | 34 | 32 | 49 | 30 | 80 |

TABLE-continued

| Example/Comparison test | | 1 | 2 | 3 | 4 | 5 | 6 | A | B | C | D |
|---|---|---|---|---|---|---|---|---|---|---|---|
| diameter, μm | | | | | | | | | | | |
| Proportion of particles >100 μm | | 0.06% | 0.08% | 0.15% | 0.08% | 0.12% | 0.11% | 0.10% | 1.2% | 0.12% | 3.8% |
| Spreading test, μm | | 45 | 50 | 60 | 50 | 55 | 60 | 60 | >100 | 60 | >100 |
| % reduction in viscosity after storing the plastisol for the times shown | 1 hour | 57 | 57 | 48 | 57 | 36 | 43 | 6 | 60 | 2 | 46 |
| | 4 days | 56 | 56 | 50 | 58 | 45 | 49 | 17 | 66* | 13 | 58* |
| | 8 days | 57 | 54 | 51 | 58 | 48 | 51 | 20 | 68* | 15 | 60* |
| Plasticizer absorption, % by weight | | 6.5 | 6.4 | 8.8 | 5.5 | 7.7 | 6.9 | 13.2 | 5.7 | 14.2 | 8.5 |
| Bulk density, g/l | | 690 | 697 | 629 | 710 | 604 | 636 | 520 | 650 | 480 | 625 |

We claim:

1. A process for preparing a plasticized vinyl chloride polymer mixture sufficiently plasticized for processing as a plastisol or organosol, which comprises mixing together a plurality of vinyl chloride polymers with a plasticizer, the resulting plasticized vinyl chloride polymer mixture comprising:
   a plasticizing amount of said plasticizer,
   a vinyl chloride polymer which is a homopolymer or copolymer, and
   5-70% by weight, relative to the total quantity of polymers in the mixture, of another vinyl chloride polymer which is a graft copolymer having a K value of 50 to 80 and an average particle size of 20 to 60 μm and which contains:
   99.5 to 88% by weight, relative to the graft copolymer, of polymerized vinyl chloride units,
   0.1 to 11.9% by weight, relative to the graft copolymer, of polymerized vinyl acetate units, and
   0.1 to 2.2% by weight, relative to the graft copolymer, of polymerized ethylene units, with the proviso that the total of the polymerized units of ethylene and vinyl acetate is 0.5 to 12% by weight, relative to the graft copolymer;
   said graft copolymer having been prepared in the presence of at least one oil-soluble activator which decomposes to give free radicals, a suspension stabilizer and an emulsifier, the graft copolymer having been prepared by polymerizing vinyl chloride or a mixture of vinyl chloride and vinyl acetate in the presence of 0.45 to 2.5% by weight, relative to the monomer or mixture of monomers employed, of a copolymer which contains 20 to 80% by weight, relative to the copolymer, of polymerized ethylene units, and which has a molecular weight, determined by osmotic methods, of 5,000 to 200,000.

2. A process according to claim 1 wherein the plasticizing amount of said plasticizer ranges from 15 to 200% by weight, relative to the weight of the vinyl chloride polymer mixture.

3. Process according to claim 1, wherein the amount, relative to the total quantity of polymers in the mixture, of said graft copolymer is 10-60% by weight.

4. Process according to claim 1 or 3, wherein said graft copolymer contains:
   99.5 to 92% by weight, relative to the graft copolymer, of polymerized units of vinyl chloride;
   0.1 to 7.9% by weight, relative to the graft copolymer, of polymerized units of vinyl acetate; and
   0.1 to 2.2% by weight, relative to the graft copolymer, of polymerized units of ethylene, with the proviso that the total of polymerized units of ethylene and vinyl acetate is 0.5 to 8% by weight, relative to the graft copolymer.

5. Process according to claim 1 or 3, wherein said graft copolymer has been prepared in the presence of an ethylene/vinyl acetate copolymer containing 40 to 65% by weight of polymerized units of vinyl acetate and 60 to 35% by weight of polymerized units of ethylene.

6. Process according to claim 1 or 3, wherein said graft copolymer has a K-value of 55 to 77.

7. A plastisol or organosol made according to claim 1 containing more than 15 but less than 200% by weight, relative to the weight of vinyl chloride polymer mixture, of said plasticizer.

* * * * *